US006831812B2

(12) United States Patent
Sode et al.

(10) Patent No.: US 6,831,812 B2
(45) Date of Patent: Dec. 14, 2004

(54) METHOD OF MANUFACTURING A THRUST PLATE, METHOD OF MANUFACTURING A SHAFT FOR A HYDRODYNAMIC BEARING, HYDRODYNAMIC BEARING, SPINDLE MOTO

(75) Inventors: Takayuki Sode, Okaya (JP); Kenji Yoshizawa, Komagane (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/248,986

(22) Filed: Mar. 7, 2003

(65) Prior Publication Data
US 2003/0184911 A1 Oct. 2, 2003

(30) Foreign Application Priority Data
Mar. 26, 2002 (JP) ........................................ 2000-085509

(51) Int. Cl.$^7$ .......................... G11B 17/02; F16C 32/06
(52) U.S. Cl. .................................... 360/99.08; 384/123
(58) Field of Search ......................... 360/98.07, 99.08; 384/107, 112, 121, 123

(56) References Cited

U.S. PATENT DOCUMENTS

| 4,437,215 | A | * | 3/1984 | Nozue et al. | .......... 29/898.041 |
| 5,127,744 | A | * | 7/1992 | White et al. | ................ 384/112 |
| 5,711,612 | A | * | 1/1998 | Itoh et al. | .................... 384/107 |
| 6,183,135 | B1 | * | 2/2001 | Kloeppel et al. | ........... 384/112 |
| 6,460,674 | B1 | * | 10/2002 | Clay | ........................ 192/70.14 |
| 6,554,476 | B2 | * | 4/2003 | Ishikawa et al. | ............ 384/123 |
| 6,702,466 | B2 | * | 3/2004 | Ishikawa et al. | ............ 384/112 |
| 6,712,514 | B2 | * | 3/2004 | Mori et al. | ................ 384/107 |
| 2001/0036327 | A1 | * | 11/2001 | Ishikawa et al. | |
| 2002/0051587 | A1 | * | 5/2002 | Narita et al. | ................ 384/100 |
| 2002/0071619 | A1 | * | 6/2002 | Tabuti et al. | ............... 384/420 |
| 2002/0122610 | A1 | * | 9/2002 | Shiraishi | ..................... 384/123 |
| 2003/0016891 | A1 | * | 1/2003 | Gomyo et al. | .............. 384/121 |
| 2003/0053250 | A1 | * | 3/2003 | Ishikawa et al. | ......... 360/99.08 |
| 2003/0136427 | A1 | * | 7/2003 | Suzuki et al. | ............ 134/22.18 |

FOREIGN PATENT DOCUMENTS

| JP | 2000-134897 A | 5/2000 |
| JP | 2001-116047 | 4/2001 |

* cited by examiner

Primary Examiner—Jefferson Evans
(74) Attorney, Agent, or Firm—Shinjyu Global IP Counselors, LLP

(57) ABSTRACT

A method of manufacturing a thrust plate for a dynamic pressure bearing in which the upper and lower end surfaces thereof have a highly precise perpendicular angle relative to the central axis thereof. The thrust plate has an annular shape, and a central hole is formed therein in which is fitted a shaft body. Thrust surfaces that form a portion of thrust bearing units are formed at both end surfaces of the thrust plate. The method of manufacturing the thrust plate includes a blanking step in which a plate-like work piece is press-cut to obtain an annular blank intermediate, an end surface polishing step in which both end surfaces of the blank intermediate are polished, and a shaving step in which an inner hole and an outer periphery of the polished blank intermediate are simultaneously press-cut to shave off surfaces thereof.

8 Claims, 7 Drawing Sheets

METHOD OF MANUFACTURING A THRUST PLATE, METHOD OF MANUFACTURING A SHAFT FOR A HYDRODYNAMIC BEARING, HYDRODYNAMIC BEARING, SPINDLE MOTO

BACKGROUND OF INVENTION

1. Field of the Invention

This invention generally relates to a method of manufacturing a thrust plate for a shaft in a dynamic pressure bearing, the shaft having an annular shaft body in which an outer peripheral surface thereof forms a portion of a radial bearing unit. More particularly, the present invention relates to a method of manufacturing a thrust plate that has an annular shape and a central hole formed therein into which the shaft body is fitted, and which has thrust surfaces formed on both end surfaces thereof that form a portion of a thrust bearing unit.

2. Background Information

A recording disk drive device for a hard disk and the like includes a spindle motor for rotatively driving a recording disk, and is concentrically disposed with respect to the recording disk. The spindle motor is primarily comprised of a stationary member to which a stator having an armature coil is fixed, a rotary member that is fixed to a rotor magnet that faces the stator, and a bearing mechanism that supports the rotary member in the stationary member such that the rotary member is freely rotatable with respect thereto.

A hydrodynamic bearing is used as the bearing mechanism in order to achieve higher speeds and lower vibration (noise). The hydrodynamic bearing is comprised of a lubricating fluid such as oil that is disposed in a small gap between the shaft and the sleeve, and a radial/thrust bearing unit that includes dynamic pressure generating grooves that are formed on opposite surfaces.

More specifically, a spindle motor for a hard disk drive in which a dynamic pressure bearing is used has been disclosed in Japanese Published Patent Application 2000-134897 and will be described below. This spindle motor is comprised of a stationary member, a rotary member, and a bearing mechanism that is provided therebetween.

The stationary member is comprised of a motor frame 10 that is fixed to the base of a hard disk drive, a cylindrical boss unit that is integral with the motor frame 10 and disposed such that it is concentric therewith, and a sleeve 14 that is fitted into and fixed to the inner peripheral surface of the cylindrical boss section. A stator 20 is fitted around the outer peripheral surface of the boss section and fixed thereto.

The rotary member is comprised of a rotor hub 16, and a shaft 22 that is integral therewith. A recording disk is mounted on the rotor hub 16. Furthermore, an annular rotor magnet 18 is mounted on the inner side of a lower portion of an outer peripheral wall of the rotor hub 16, and faces the stator 20 in the radial direction. The shaft 22 is disposed such that it is capable of rotating inside the sleeve 14, and herringbone shaped dynamic pressure generating grooves are formed on one or both of an outer peripheral surface of the shaft 22 and an inner peripheral surface of the sleeve 14. The gap between both of these opposing surfaces is filled with a lubricating agent such as oil, thus forming a pair of vertically disposed radial dynamic pressure bearing units. A thrust plate (not labeled with a reference numeral) provided on the lower end of the shaft is housed in a lower end large diameter section of the sleeve 14, and a thrust cover 12 is fitted into fixed to the lower end opening of a boss on the motor frame 10 so as to close the lower end large diameter section of the sleeve 14. Herringbone shaped or spiral shaped dynamic pressure generating grooves are formed on one or both of the upper surface of the thrust plate and a thrust surface of the sleeve 14 that opposes the upper surface of the thrust plate. The gap between these opposing surfaces is filled with a lubricating agent to thereby form an upper thrust dynamic pressure bearing unit. Herringbone shaped or spiral shaped dynamic pressure generating grooves are formed on one or both of the bottom surface of the thrust plate and the thrust cover 12 that opposes the bottom surface of the thrust plate, and a gap between these opposing surfaces is filled with a lubricating agent to thereby form an lower thrust dynamic pressure bearing unit.

In a dynamic pressure bearing spindle motor constructed in this manner, when the coil of the stator 20 is supplied with electricity, rotational torque is generated by the electromagnetic interaction between a rotating magnetic field of the stator 20 and a multipolar magnetic field of the rotor magnet 18, thereby rotating a rotary member which includes the rotor hub 16, the shaft 22 and a rotation load (recording disk). During this rotation, the radial load of the rotary member is supported by the pair of vertically disposed radial dynamic pressure bearing units formed between the shaft 22 and the sleeve 14, and the thrust load of the rotary member is supported by the pair of thrust dynamic pressure bearing units formed respectively between the thrust plate and the sleeve 14 and the thrust cover 12.

However, in a dynamic pressure bearing as described above, the dynamic pressure bearing shaft forms both a radial dynamic pressure bearing unit on the shaft body and thrust dynamic pressure bearing units on both surfaces of the thrust plate. This configuration requires a highly precise perpendicular angle between the outer peripheral surface of the shaft body and the planes of the thrust plate. More specifically, the radial gap in the radial bearing unit between the outer peripheral surface of the shaft body and the inner peripheral surface of the sleeve is normally several $\mu$m, and the thrust gap in the thrust bearing units between both surfaces of the thrust plate and the sleeve and the thrust cover is normally about 10 $\mu$m. Thus, there is a need for the degree of precision in the perpendicular angle of the planes of the thrust plate relative to the axial center line of the shaft to be within several $\mu$m or less.

On the other hand, because the end portion of shaft body of the dynamic pressure bearing shaft disclosed in the aforementioned Japanese Published Patent Application 2000-134897 is press fit into and fixed to the central hole of the thrust plate, and the shaft body and the thrust plate are separate components, it will be more difficult to obtain a perpendicular angle between the thrust plate planes relative to the axial center line of the shaft body that it would be when the shaft is manufactured by cutting it from a unitary member and machining it. It is possible, however, to use a tool to secure the proper degree of precision during shaft body press fitting relative to the central hole of the thrust plate. In other words, if a sufficiently high degree of precision in the perpendicular angle of the central hole in relation to the thrust plate planes can be achieved (i.e., a degree of precision of several $\mu$m or less), a dynamic pressure bearing with good rotation run-out precision can be obtained.

Accordingly, we will now look at the problems with the perpendicular angle of the central axis in relation to the surface planes of the thrust plate. In situations in which a spindle motor rotatively drives a recording disk that is, for example, 3.5 inch in diameter, a thrust plate having an outer diameter of 7 to 8 mm, an inner diameter of 4 mm, and a thickness of 2 to 3 mm will be employed, and is normally obtained by press forming.

A machining process that uses press cutting (shearing) to obtain an inner peripheral surface of a blank intermediate will produce sheared surfaces, ruptured surfaces, and/or turned up edges (burrs) on the press-cut surfaces. Thus, at the last step of machining, it will be necessary to both finish the inner and outer peripheral surfaces, and to finish both end surfaces. In this situation, it is difficult to reliably obtain a sufficient degree of precision even when the inner and outer peripheral surfaces are finished, and thus it will be difficult to reliably obtain a sufficient degree of precision in the perpendicular angle of the central axis relative to the surface planes of the thrust plate.

Next, a machining process which uses a coining step to obtain an inner peripheral surface of a blank intermediate will be described. This method of manufacturing includes a blanking step, a dual-side polishing step, a barrel step, a finish polishing step, a coining step, and a flattening step. In the blanking step, an annular blank intermediate is pressed cut from a plate-like work piece. Then, a blank intermediate having a degree of precision in its inner peripheral surface is obtained by means of the dual-side polishing step, the barrel step, and the finish polishing. In the coining step, the blank intermediate is put into a coining die and surface-pressed to improve, primarily, the precision of the inner diameter and the perpendicular angle of both end surfaces with respect thereto. More specifically, a pin having an outer diameter finished with a good degree of precision is placed in the center of the coining die, the pin is inserted into the central hole of the blank intermediate, and the blank intermediate is pressed from both surfaces in this state. Then, the blank intermediate is slightly squeezed, thereby causing a portion thereof to flow toward the inner and outer diameters. As a result, the blank intermediate will have an inner and outer diameter that corresponds to the coining die. In the flattening step, both surfaces of the blank intermediate are pressed to a predetermined height.

In the coining step, however, the material that forms the blank intermediate will not flow in the radial directions in a uniform manner, and thus it will be easy to produce non-uniform surfaces. Thus, the degree to which both end surfaces of the blank intermediate are parallel to each other will be poor, and there will be large fluctuations thereon. In addition, the fluctuations will not sufficiently eliminated in the pressing step, with the result that the heights of products will differ.

SUMMARY OF INVENTION

It is an object of the present invention to provide a method of manufacturing a thrust plate used in a dynamic pressure bearing that employs a shaft in which the shaft body thereof is fitted into the thrust plate, the thrust plate having a reliable and highly precise degree of run-out precision (perpendicular angle) in the end surfaces thereof relative to a central axis thereof, which thus enhances the bearing performance of the dynamic pressure bearing.

According to one aspect of the present invention, a method of manufacturing a thrust plate for a shaft in a dynamic pressure bearing is disclosed in which the shaft includes an annular shaft body in which an outer peripheral surface thereof forms a portion of a radial bearing unit, and a thrust plate having a central hole formed therein in which the shaft body is fitted and thrust surfaces on both end surfaces thereof that form portions of thrust bearing units.

The method of manufacturing include a blanking step in which a plate-like work piece is press-cut to obtain an annular blank intermediate, an end surface polishing step in which both end surfaces of the blank intermediate are polished, and a shaving step in which an inner hole and an outer periphery of the polished blank intermediate are simultaneously press-cut to shave off surfaces thereof.

In this method, a high degree of precision can be reliably obtained in the inner peripheral surfaces because the inner and outer peripheral surfaces of the blank intermediate are shaved off. Moreover, unlike in prior art methods of manufacturing which use a coining step, the degree to which both surfaces of the thrust plate are parallel to each other will maintained at a high level. As a result, a high level of run-out precision (perpendicular angle) in the end surfaces of the thrust plate relative to a central axis thereof can be ensured. Note that shaving is a machining process to again shave a press-cut surface created after the shearing process with a similar shearing tool.

According to another aspect of the present invention, the direction in with the blank intermediate is press-cut in the shaving step is identical with that of the blanking step.

Thus, a fully sheared surface is easy to obtain on the inner peripheral surface of the thrust plate, which improves the precision of the inner peripheral surface.

According to another aspect of the present invention, the end surfaces of the blank intermediate are pressed in the shaving step from both sides thereof in the press-cutting direction.

A high degree of run-out precision (perpendicular angle) in end surfaces of the thrust plate can be secured relative to a central axis thereof at a high level because the degree to which both surfaces of the blank intermediate are parallel to each other has been improved by the dual-side polishing step, and both surfaces have been pressed.

According to another aspect of the present invention, press-cutting is performed in the blanking and shaving steps so as to obtain a fully sheared surface on the press-cut cut surfaces.

This improves the degree of precision of the inner peripheral surface of the thrust plate.

According to another aspect of the present invention, a method of manufacturing a shaft for a dynamic pressure bearing comprises the steps of manufacturing the thrust plate according to the present invention, and fitting the shaft body into the central hole of the thrust plate.

This method will allow the perpendicular angle between the central axis of the shaft body and the planes of the thrust plate to have a high degree of precision.

According to another aspect of the present invention, a dynamic pressure bearing includes the shaft for the dynamic pressure bearing according to the present invention, and a hollow cylindrical member having a through-hole formed therethrough in which the shaft for the dynamic pressure bearing passes. The cylindrical member includes a radial inner peripheral surface that faces an outer peripheral surface of the shaft body with a small gap interposed therebetween, and thrust surfaces facing both end surfaces of the thrust plate with small gaps interposed therebetween. In addition, a radial bearing unit includes the outer peripheral surface of the shaft body, the radial inner peripheral surface of the hollow cylindrical member, and a lubricating fluid disposed in the small gap. Furthermore, thrust bearing sections include both end surfaces of the thrust plate, the thrust surfaces of the hollow cylindrical member, and a lubricating fluid disposed in the small gap.

The bearing performance of the dynamic pressure bearing is improved because it uses the shaft manufactured by means of the method of the present invention. More specifically, a shaft manufactured in this way enables high speed rotation.

According to another aspect of the present invention, a spindle motor includes the dynamic pressure bearing according to the present invention, a stator that is non-rotatably disposed with respect to either the shaft of the dynamic pressure bearing or the hollow cylindrical member, and a rotor magnet which generates a rotating magnetic field in cooperation with the stator, the rotor magnet non-rotatably disposed with respect to the hollow cylindrical member if the stator is non-rotatably disposed with respect to the shaft of the dynamic pressure bearing, and non-rotatably disposed with respect to the shaft of the dynamic pressure bearing if the stator is non-rotatably disposed with respect to the hollow cylindrical member.

High speed rotation is enabled because the spindle motor uses a dynamic pressure bearing according to the present invention.

According to another aspect of the present invention, a recording disk drive device includes a housing, a spindle motor according to the present invention fixed inside the housing, a disk shaped recording medium non-rotatably disposed with respect to the shaft of the dynamic pressure bearing or the hollow cylindrical member and capable of recording data, and data access means for writing data to or reading data from a desired location on the recording medium.

Improvement in data writing and reading speeds can be achieved because the recording disk drive device employs a spindle motor according to the present invention.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure.

DETAILED DESCRIPTION

1. First Embodiment a. Overall Structure of Spindle Motor

Figure 1:
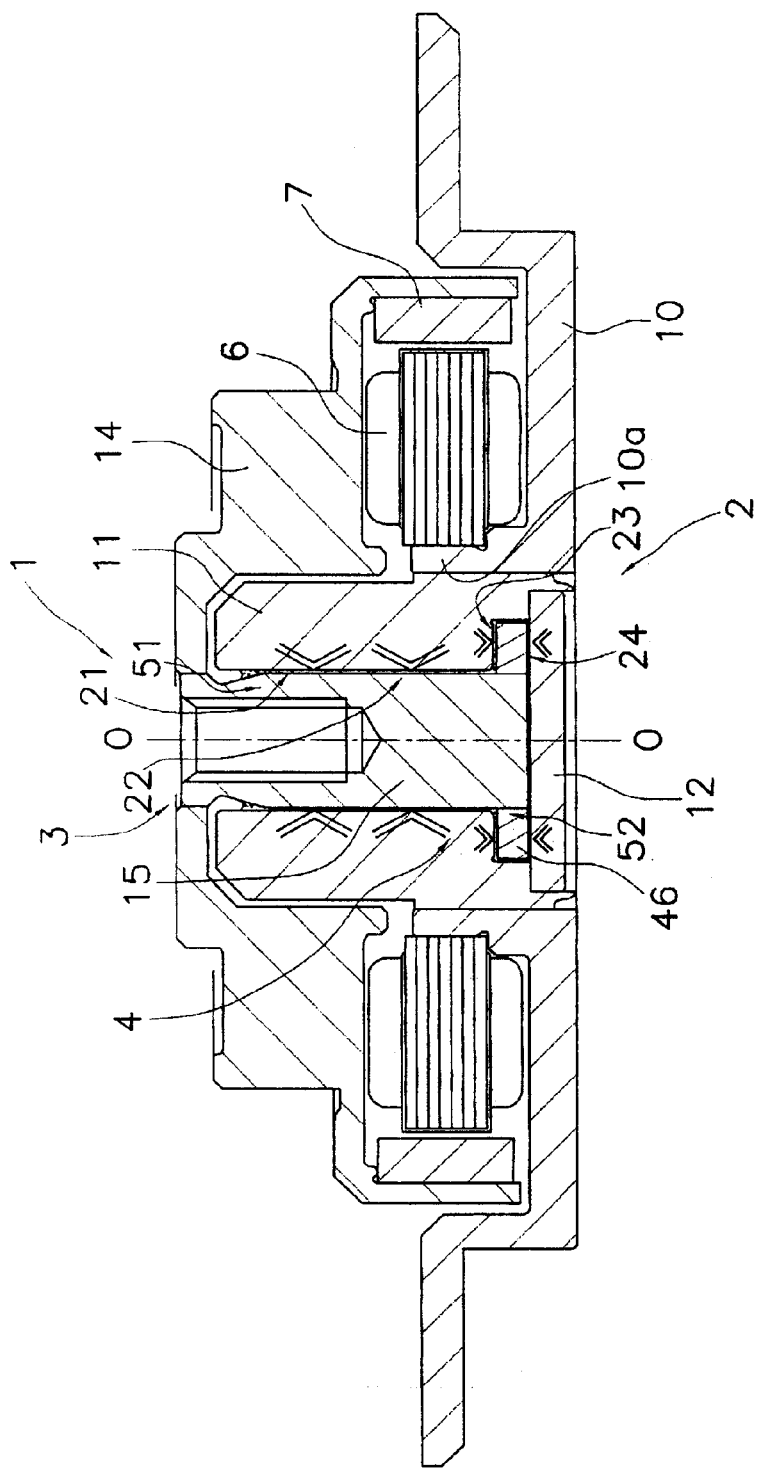
FIG. 1 is a simplified longitudinal cross-section of a spindle motor according to a first embodiment of the present invention.

FIG. 1 is a longitudinal cross-sectional view showing a simplified construction of a spindle motor 1 according to one embodiment of the present invention. The spindle motor 1 is a spindle motor for a recording disk drive and forms a portion of a recording disk drive device such as a hard disk and the like.

Note that the line O—O shown in FIG. 1 is the axis of rotation of the spindle motor 1. In addition, although the vertical direction in FIG. 1 is described in this embodiment as the axial vertical direction for the sake of convenience, the actual position in which the spindle motor 1 is mounted is not limited thereto.

In FIG. 1, the spindle motor 1 is primarily comprised of a stationary member 2, a rotary member 3, and a bearing mechanism 4 for supporting the rotary member 3 in the stationary member 2 such that the rotary member 3 is freely rotatable in the stationary member 2. The spindle motor 1 further includes a stator 6 comprising a stator core fixed to the stationary member 2 and a coil wound around the stator core, and a rotor magnet 7 fixed to the rotary member 3. Both members form a magnetic circuit for applying a rotational force to the rotary member 3.

b. Stationary Member

The stationary member 2 is comprised of a bracket 10, and a sleeve 11 that is fixed inside a central opening in the bracket 10. More specifically, a cylindrical portion 10a that extends upward in the axial direction is formed on the edge of the central opening of the bracket 10, and an outer peripheral surface of the sleeve 11 is fit into an inner peripheral surface of the cylindrical section 10a. The stator 6 is fixed to the outer peripheral surface of the cylindrical section 10a.

Figure 2:
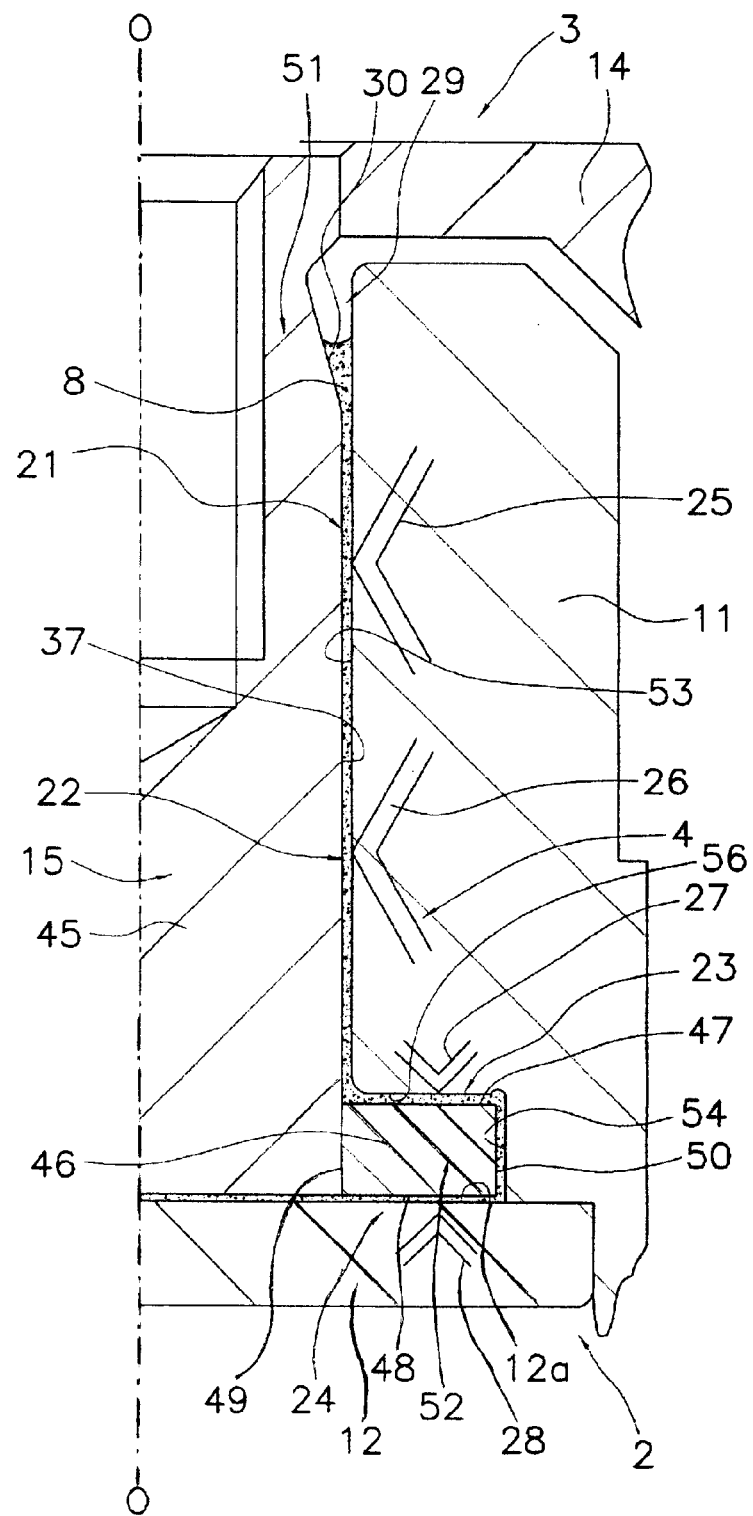
FIG. 2 is a partially enlarged view of FIG. 1 which describes each bearing unit of the bearing mechanism and the through hole of the shaft.

The sleeve 11 is a cylindrical member, and a through hole 51 that passes therethrough in the axial direction is formed in the approximate central portion thereof. As shown in FIG. 2, the inner peripheral surface of the through hole 51 in the sleeve 11 has a radial inner peripheral surface 53 and a lower inner peripheral surface 54. The lower inner peripheral surface 54 of the sleeve 11 forms a step portion 52 in the lower end of the through hole 51. The step portion 52 has a diameter that is larger than the radial inner peripheral surface 53, and has a thrust surface 56 that faces downward in the axial direction and a lower inner peripheral surface 54, both of which extend around the through hole 51.

A thrust cover 12 is fixed to the lower end of the through hole 51 of the sleeve 11, and the thrust cover 12 closes the lower end of the through hole 51. The outer peripheral side of the upper surface in the axial direction of the thrust cover 12 serves as a thrust surface 12a that faces the thrust surface 56 of the sleeve 11 in the axial direction.

c. Rotary Member

The rotary member 3 is supported by the sleeve 11 so as to be freely rotatable therewith via a bearing mechanism 4, and is comprised of a rotor hub 14 in which a recording disk is mounted on the outer peripheral portion thereof, and a shaft 15 that is positioned on the inner peripheral side of the rotor hub 14 and axially supported by the sleeve 11 via the bearing mechanism 4.

The rotor hub 14 is disposed above the stationary member 2 and the stator 6 in the vicinity thereof. A rotor magnet 7 is fixed to an inner peripheral surface of a cylindrical section of the rotor hub 14 with an adhesive or the like. The rotor magnet 7 faces the stator 6 with a small gap interposed therebetween in the radial direction. By supplying electricity to the stator, a torque acts on the rotary member 3 through an electromagnetic interaction between the stator 6 and the rotor magnet 7.

The shaft 15 is comprised of a cylindrical shaft body 45, and a thrust plate 46 that is fit onto the lower end thereof.

The upper end portion in the axial direction of the shaft body 45 of the shaft 15 is fitted into a central hole in the rotor hub 14. Note that the shaft body 45 may be press fit into the thrust plate 46 and the rotor hub 14, adhered thereto, or may be fitted using another method known to one of ordinary skill in the art.

The thrust plate 46 is an annular disk member that projects outward in the radial direction from an outer peripheral surface of the shaft body 45 at the lower end thereof, and forms a flange on the shaft body 45. The thrust plate 46 includes an inner peripheral surface 49 into which one end of the shaft body 45 is press fit, an outer peripheral surface 50, an upper thrust surface 47 on the shaft body side and a lower thrust surface 48 opposite thereto. The upper thrust surface 47 of the thrust plate 46 faces the thrust surface 56 of the sleeve 11 with a small gap interposed therebetween, and the lower thrust surface 48 of the thrust plate 46 faces the thrust surface 12a of the thrust cover 12 with a small gap interposed therebetween.

d. Bearing Mechanism

The bearing mechanism 4 is a hydrodynamic bearing which serves to support the rotary member 3 with respect to the stationary member 2. More specifically, the bearing mechanism 4 supports the rotor hub 14 and the shaft 15 with respect to the sleeve 11 via a lubricating oil 8 such that the rotor hub 14 and the shaft 15 are freely rotatable with respect thereto. The bearing mechanism 4 includes first and second radial bearing units 21 and 22, and first and second thrust bearing units 23 and 24. FIG. 2 will be used below to provide a description of the structure of each of the bearing units 21 to 24 while referring to structure of the sleeve 11, the thrust cover 12, and the shaft 15.

(i) Radial Bearing Units

The radial inner peripheral surface 53 of the sleeve 11 faces an outer peripheral surface 37 of the shaft body 45 of the shaft 15 so as to secure a small radial gap in which the lubricating oil is held therebetween. A plurality of herringbone shaped dynamic pressure generating grooves 25 and 26 which are formed side by side in the axial direction and which serve to generate dynamic pressure in the lubricating oil 8 are formed in the radial inner peripheral surface 53 of the sleeve 11 in the peripheral direction. Thus, the first and second radial bearing units 21 and 22 are formed side by side in the axial direction, and are comprised of the radial inner peripheral surface 53 of the sleeve 11, the outer peripheral surface 37 of the shaft body 45 of the shaft 15, and the lubricating oil 8 which resides therebetween.

(ii) Thrust Bearing Units

A plurality of herringbone shaped dynamic pressure grooves 27 for generating dynamic pressure in the lubricating oil 8 during the rotation of the shaft 15 are formed in the thrust surface 56 of the sleeve 11 and arranged in the peripheral direction. Thus, the first thrust bearing unit 23 is comprised of the thrust surface 56 of the sleeve 11, the upper thrust surface 47 of the thrust plate 46, and the lubricating oil 8 that resides therebetween.

A plurality of herringbone shaped dynamic pressure generating grooves 28 which serve to generate dynamic pressure in the lubricating oil 8 during rotation of the shaft 15 are formed on the thrust surface 12a of the thrust cover 12 in the peripheral direction. Thus, the second thrust bearing unit 24 is comprised of the lower thrust surface 48 of the thrust plate 46, the thrust surface 12a of the thrust cover 12, and the lubricating oil 8 which resides therebetween.

Thus, a hollow cylindrical member that rotates relative to the shaft 15 is comprised of the sleeve 11 and the thrust cover 12. In other words, the hollow cylindrical member is formed by the through hole 51 through which the shaft 15 passes, and includes the radial inner peripheral surface 53 that faces the outer peripheral surface 37 of the shaft body 45 with a small gap interposed therebetween, and the thrust surfaces 56 and 12a that face the upper and lower thrust surfaces 47 and 48 of the thrust plate 46 with a small gap interposed therebetween.

A surface tension seal 29 is a structure which prevents leakage of the lubricating oil 8 from the first radial bearing unit 21, and is formed in the outer end in the axial direction of the first radial bearing unit 21 by means of an inner peripheral surface of the sleeve 11 and an outer peripheral surface of the shaft 15. More specifically, a slope 30 is formed in a portion of the outer peripheral surface of the shaft 15 that is outside of the first radial bearing unit 21 in the axial direction such that it widens the gap between the outer peripheral surface of the shaft 15 and the inner peripheral surface of the sleeve 11 outward in the axial direction. The surface tension of the lubricating oil 8 held in the bearing unit and the outside air pressure are balanced, and the meniscus of the lubricating oil 8 is positioned at a point on the slope 30. As a result, if the lubricating oil 8 attempts to move further outward, the curvature of the liquid surface try to grow larger, and thus this movement will be resisted and the movement of the lubricating oil 8 outside the bearing unit will be suppressed.

As described above, the bearing mechanism 4 is comprised of the first radial bearing unit 21, the second radial bearing unit 22, the first thrust bearing unit 23, and the second thrust bearing unit 24, and each of the bearing units are continuously filled with lubricating oil. Furthermore, the lubricating oil 8 in each of the bearing units is sealed by the surface tension seal 29 formed in the gap between the outer peripheral surface of the shaft 15 and the inner peripheral surface of the sleeve 11 in the upper portion thereof in the axial direction.

Note that while, in FIGS. 1 and 2, graphic symbols are used to illustrate each of the dynamic pressure generating grooves 25, 26, 27 and 28 for the sake of convenience, but that the grooves are in fact formed in each of the surfaces 53, 53, 56 and 12a noted above.

e. Method of Manufacturing the Shaft

A method of manufacturing the shaft 15, and more particularly, a method of manufacturing the thrust plate 46, will be provided below with reference to FIG. 3. This method of manufacturing includes: (i) a press cutting step, (ii) an end surface polishing step, (iii) a shaving step and (iv) a finishing step. Note that FIGS. 3(a) to 3(f) are simplified views which depict the changes in the shape of the blank intermediate B, and in which emphasis has been placed on the changes therein in order to more clearly describe the present invention.

(i) Press Cutting Step

Blanking

Figure 3A:
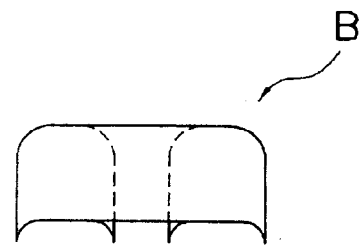
FIGS. 3a–3f shows changes in the shape of a blank work piece produced in a method of manufacturing a thrust plate according to the present invention.
Figure 3B:
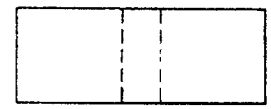
Figure 3C:
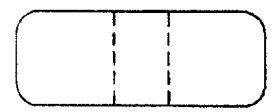
Figure 3D:
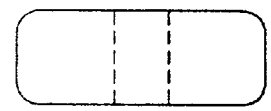
Figure 3E:
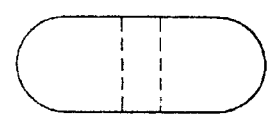
Figure 3F:
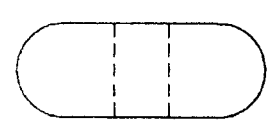

As shown in FIG. 3(a), an annular blank intermediate B is pressed cut from a work piece (a plate) such as stainless steel or copper alloy. For example, a blank intermediate B having an outer diameter of 7 to 8 mm and an inner diameter of 3 to 4 mm is obtained from a plate-shaped work piece that has a thickness of 2.5 mm.

In this situation, it is preferable that no rupture surfaces are produced on the press cut surfaces (inner and outer peripheral surfaces), and that the blank be cut such that it has a fully sheared surface. In particular, it is preferable that a technique known as fine blanking be adopted (in which pressure is applied to a blank work piece to be press cut from both surfaces in the press direction to prevent shear droop from occurring), or another technique equivalent thereto be adopted.

The blank intermediate B obtained thereby have an inner diameter that is 0.1 mm smaller and an outer diameter that is 0.1 mm larger than the inner and outer diameters of a finished thrust plate 46.

(ii) End Surface Polishing Step

Rough Dual-Side Polishing

As shown in FIG. 3(*b*), both surfaces are polished in order to increase the degree to which both end surfaces of the blank intermediate B are parallel to each other. For example, a dual-side surface grinder is employed.

Burr Removal

As shown in FIG. 3(*c*), burrs produced by the aforementioned rough polishing are removed, and at the same time edge rounding is performed. For example, a machine known as a high speed centrifugal barrel is used.

(iii) Shaving Step

Inner and Outer Diameter Finishing Press-Cutting

As shown in FIG. 3(*c*), the inner and outer peripheral surfaces of the blank intermediate B are simultaneously pressed cut at a right angle to both polished surfaces thereof in order to remove a portion of the peripheral surfaces. Thus, the shaving process is a machining process that uses the same shearing tool to remove a small amount of the surfaces created in the shearing process.

In this situation, the blank intermediate B is preferably machined in the same direction as in the blanking step. By doing so, a fully sheared surface is easier to obtain, and thus the inner peripheral surface will finely finished at the same time that an extremely high degree of circularity and cylindricality will be obtained.

In addition, it is preferable to use a fine blanking process during this machining step. This process will produce a thrust plate having the required inner and outer diameters.

Figure 4:
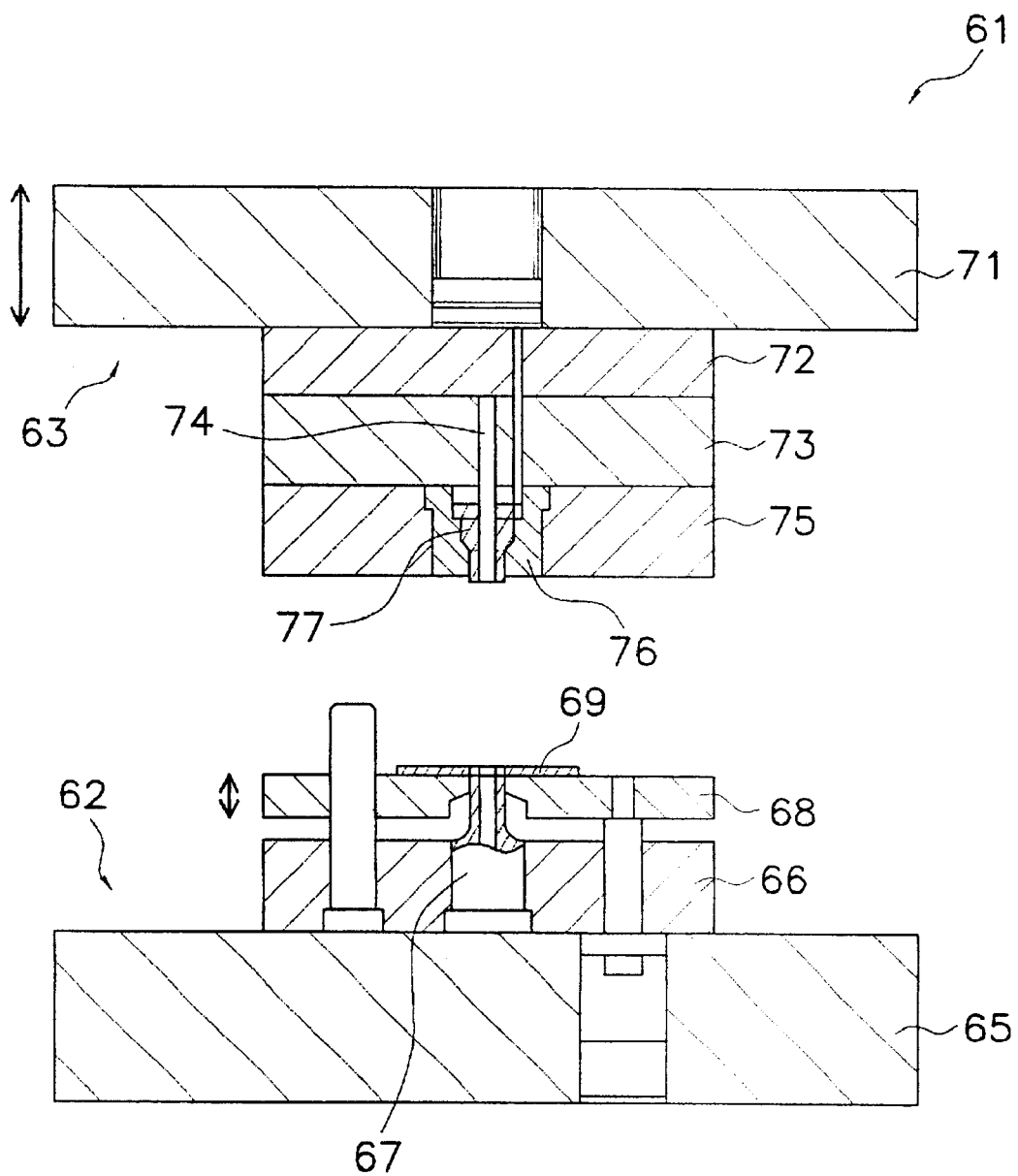
FIG. 4 is a simplified longitudinal cross-section of a metal die used in a shaving step for a thrust plate.
Figure 5:
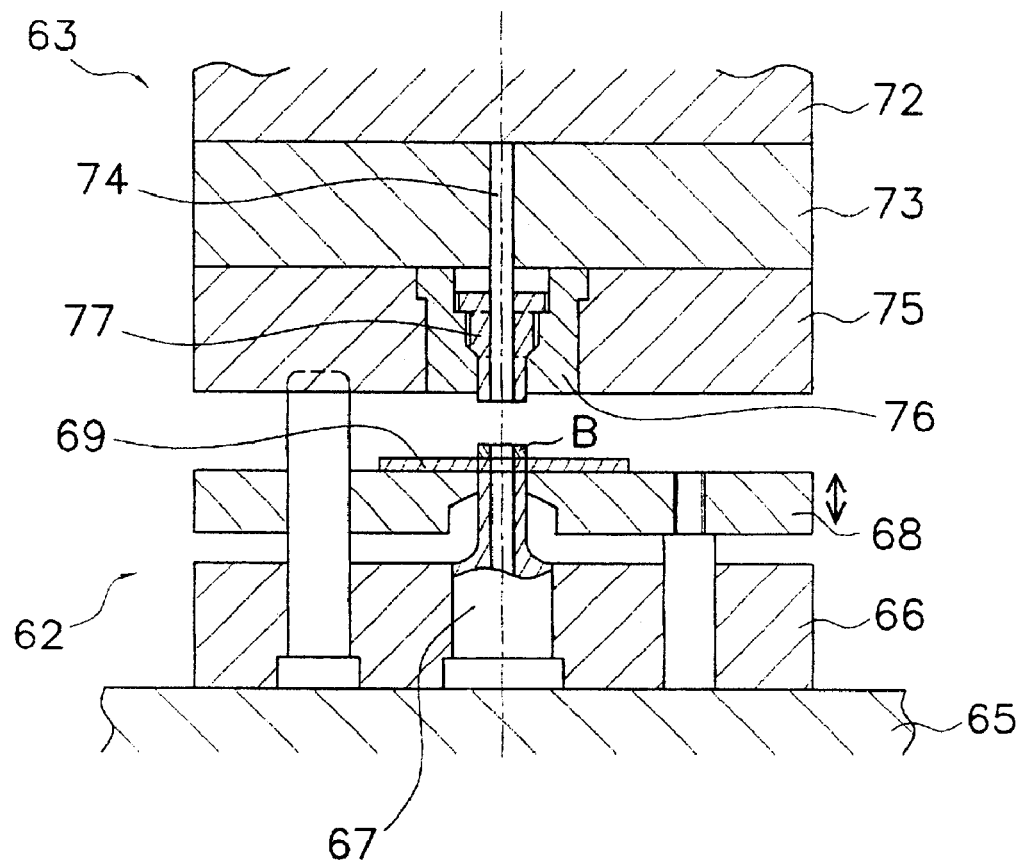
FIG. 5 is an enlarged view of a portion of FIG. 4.

FIGS. 4 and 5 show an example of a metal die for a press specifically used in the shaving process. The metal die 61 is comprised of a fixed lower die 62 and a vertically movable upper die 63.

Figure 6:
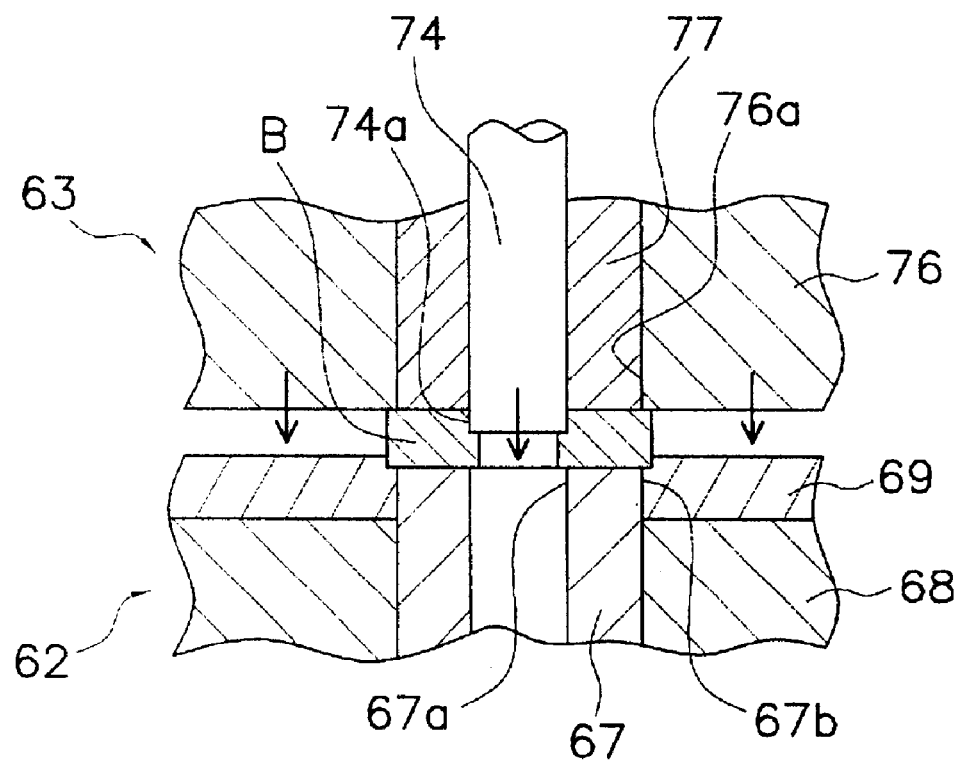
FIG. 6 is a simplified longitudinal cross section of the metal die shown in FIGS. 4 and 5 during the shaving step.

The lower die 62 includes a base 65, a punch plate 66 that is fixed onto the base 65, a lower punch 67 that is supported by the punch plate 66, a stripper plate 68 that is supported with respect to the punch plate 66 such that it can freely move up and down and biased upward by a spring or the like, and a guide 69 that is disposed on top of the stripper plate 68 and which maintains the position of the blank intermediate B on the lower punch 67. As shown in FIG. 6, the lower punch 67 has a cylindrical shape that is open on the upper side thereof, and includes an inner peripheral brim 67*a* and outer peripheral brim 67*b*.

The top die 63 is comprised of a die set 71 that is coupled to a cylinder or the like that generates a vertical drive force, a hacking plate 72 that is fixed to the lower surface of the die set 71, a punch plate 73 that is fixed onto the lower surface of the hacking plate 72, a rod-like pierce punch 74 that is fixed to the punch plate 73 so as to protrude downward therefrom, a die plate 75 that is fixed to the lower surface of the punch plate 73, and a die punch 76 that is fixed to the die plate 75. The pierce punch 74 extends through a hole in the die punch 76, and the lower end thereof protrudes downward beyond the lower end surface of the die punch 76. The outer peripheral brim 74*a* of the pierce punch 74 is formed so as to correspond to the inner peripheral brim 67*a* of the lower punch 67. The inner peripheral brim 76*a* of the die punch 76 has a gap in a radial direction between the brim 76*a* and the pierce punch 74, and corresponds to the outer peripheral brim 67*b* of the lower punch 67. A knockout 77 is a cylindrical member anchored around the pierce punch 74 such that it is vertically movable in the central hole of the die punch 76. The knockout 77 is moved to stay at the lowest position in the hole of the die punch 76 in FIG. 5, because it is biased downward by a pushing force from a pushing member not shown in the figures. In this state, the lower end surface of the knockout 77 is almost flush with the lower end surface of the pierce punch 74.

The actual shaving process will now be described with reference to FIG. 6. The pierce punch 74 enters into the inner diameter portion of the blank intermediate B and cuts off a portion of the inner peripheral surface therein in accordance with a downward movement of the top die 63. In other words, the pierce punch 74 becomes the upper punch for inner diameter press-cutting, and the outer peripheral brim 74*a* shaves the inner diameter of the blank intermediate B between the brim 74*a* and the inner peripheral brim 67*a* of the lower punch 67. Simultaneously therewith, the die punch 76 shaves the outer peripheral surface of the blank intermediate B. In other words, the die punch 76 becomes the upper punch for outer diameter press-cutting, and the inner peripheral brim 76*a* performs outer diameter shaving of the blank intermediate B between the brim 76*a* and the outer peripheral brim 67*b* of the lower punch 67. During this operation, the die plate 75 is brought into contact with the stripper plate 68 and moves it downward.

In the operation described above, the knockout 77 pushes the upper surface of the blank intermediate B retained by the guide 69, applies pressure on the blank intermediate B between the knockout 77 and the lower punch 67, and thus achieves the fine blanking process. In this process, a run-out precision (perpendicular angle) can be obtained on the thrust plate 46 that is significantly better than that found in the prior art because the degree to which both end surfaces of the blank intermediate B are parallel with each other has been improved by the aforementioned end surface polishing step (particularly the rough dual side polishing step therein).

(iv) Finishing Step

Barrel (Edge Rounding)

As shown in FIG. 3(*e*), edge rounding is performed on the blank intermediate B.

Finish Polishing and Burr Removal

As shown in FIG. 3(*f*), finish polishing is performed in order to achieve a high degree of flatness, and then any barreling that is caused by this process is corrected. Thereafter, any burrs generated by the above polishing are removed.

Finally, one end of the shaft body 45 is press fitted or adhered into the central hole, i.e. the inner peripheral surface 49, in the thrust plate 46 to complete the shaft 15.

f. Effects of the Method of Manufacturing the Thrust Plate (i) The degree of precision of the inner peripheral surface 49 of the thrust plate 46 can be reliably increased to a high level because the inner and outer peripheral surfaces of the blank intermediate B are removed in the shaving process. Furthermore, unlike prior art methods of manufacturing in which a coining step is employed, the degree to which the upper and lower thrust surfaces 47 and 48, i.e., both respective end surfaces of the thrust plate 46, are parallel to each other can be maintained at a high level. As a result, the run-out precision (perpendicular angle) of the upper and lower thrust surfaces 47 and 48 in relation to the central axis of the thrust plate 46 can be maintained at a high level.

(ii) After press-cutting a blank work piece B (blank step), a run-out precision (perpendicular angle) that is significantly better than the prior art can be obtained by securing the degree to which both end surfaces thereof are parallel to each other at the same time that both end surfaces are polished, burrs are removed, and edge rounding takes place (end surface polishing step), and by shaving off the inner and outer peripheral surfaces thereof with the polished surfaces thereof serving as a reference (shaving step). In a prior art method of manufacturing in which a blank work piece is press-cut and then finished to obtain a thrust plate, the maximum run-out precision was 10 μm. However, a run-out precision on the order of several μm can be secured by adopting of the present invention. Moreover, this precision can be maintained at all times, thereby enabling a reliable supply of high precision products.

Note that by adopting the present method of manufacturing, a thrust plate up to 10 mm in thickness can be attained with a high degree of precision.

g. Structure of a Hard Disk Device

One embodiment of a spindle motor 1 for a recording disk drive according to the present invention has been described above. However, a hard disk device equipped with the spindle motor 1 according to the present invention will be described below as an example of the recording disk drive.

Figure 7:
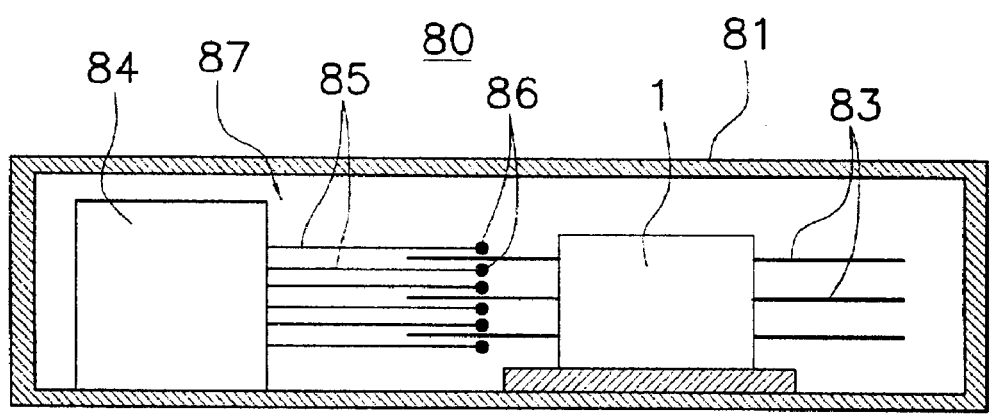
FIG. 7 is a simplified diagram of a standard hard disk device.

FIG. 7 shows the general internal structure of a standard hard disk device 80. A clean space is formed inside a housing 81 in which there are only extremely minute quantities of dirt, dust, and the like. The spindle motor 1 is disposed in the housing 81, and has a circular recording disk 83 mounted thereon that stores data. Furthermore, a magnetic head moving mechanism 87 is also mounted therein, which reads and/or writes data to or from the recording disk 83. The magnetic head moving mechanism 87 comprises a head 86 that reads data from and/or writes data to the recording disk 83, arms 85 that support the head 86, and an actuator 84 that moves the head 83 and the arms 85 to the desired positions.

2. Other Embodiments

The present invention is not limited to the above embodiment, and various modifications and revisions thereof can be implemented without departing from the scope of the present invention.

More specifically, the present invention is not limited to the dynamic pressure bearing, the motor or the recording disk drive device shown in the above embodiment. For example, the lubricating fluid used therein is not limited to an oil but may instead be a gas. Furthermore, in the bearing units of the dynamic pressure bearing, no specific limitation is imposed on the presence or absence of the dynamic pressure generating grooves, the formed members or shapes thereof.

In addition, in the embodiment shown in the figures, the spindle motor was described as being of a so-called shaft rotation type in which the shaft 15 is fixed to the rotor hub 14 to form the rotary member 3. However, the present invention can be applied to a spindle motor of a so-called fixed shaft type in which the shaft forms a portion of the stationary member.

Terms of degree such as "substantially", "about" and "approximately" that may be used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-085509. The entire disclosure of Japanese Patent Application No. 2002-085509 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of manufacturing a thrust plate for a shaft in a dynamic pressure bearing, the shaft comprising an annular shaft body in which an outer peripheral surface thereof comprises a portion of a radial bearing unit, and a thrust plate comprising a central hole formed therein in which the shaft body is fitted and thrust surfaces on both end surfaces thereof that comprise portions of thrust bearing units, the method of manufacturing comprising the steps of: press-cutting a plate-like work piece to obtain an annular blank intermediate; polishing both end surfaces of the blank intermediate; and simultaneously press-cutting an inner hole and an outer periphery of the polished blank intermediate to shave off surfaces of a periphery of the inner hole and the outer periphery thereof.

2. The method of manufacturing a thrust plate set forth in claim 1, wherein a direction in which the blank intermediate is press-cut in the shaving step is identical with that of the blanking step.

3. The method of manufacturing a thrust plate set forth in claim 1, wherein the end surfaces of the blank intermediate are pressed in the shaving step from both sides thereof in the press-cutting direction.

4. The method of manufacturing a thrust plate set forth in claim 1, wherein press-cutting is performed in the blanking and shaving steps so as to obtain a fully sheared surface on the press-cut surfaces.

5. A method of manufacturing a shaft for a dynamic pressure bearing, comprising the steps of:

the method of manufacturing a thrust plate set forth in claim 1; and fitting the shaft body into the central hole of the thrust plate.

6. A dynamic pressure bearing comprising:

the shaft for the dynamic pressure bearing manufactured according to the method set forth in claim 5; and a hollow cylindrical member having through-hole formed therethrough in which the shaft for the dynamic pressure bearing passes, and which comprises a radial inner peripheral surface that faces an outer peripheral surface of the shaft body with a small gap interposed therebetween, and thrust surfaces facing both end surfaces of the thrust plate with small gaps interposed therebetween;

wherein a radial bearing unit is comprised of the outer peripheral surface of the shaft body, the radial inner peripheral surface of the hollow cylindrical member, and a lubricating fluid disposed in the small gap, and thrust bearing sections are comprised of both end surfaces of the thrust plate, the thrust surfaces of the hollow cylindrical member, and a lubricating fluid disposed in the small gap.

7. A spindle motor comprising:

the dynamic pressure bearing set forth in claim 6;

a stator that is non-rotatably disposed with respect to either the shaft of the dynamic pressure bearing or the hollow cylindrical member; and a rotor magnet which generates a rotating magnetic field in cooperation with the stator, the rotor magnet non-rotatably disposed with respect to the hollow cylindrical member if the stator is non-rotatably disposed with respect to the shaft of the dynamic pressure bearing, and non-rotatably disposed with respect to the shaft of the dynamic pressure bearing if the stator is non-rotatably disposed with respect to the hollow cylindrical member.

8. A recording disk drive device comprising:

a housing;

the spindle motor set forth in claim 7 fixed inside the housing;

a disk shaped recording medium non-rotatably disposed with respect to the shaft of the dynamic pressure bearing or the hollow cylindrical member and capable of recording data; and data access means for writing data to or reading data from a desired location on the recording medium.

* * * * *

UNITED STATES PATENT AND TRADEMARK OFFICE
CERTIFICATE OF CORRECTION

PATENT NO. : 6,831,812 B2
DATED : December 14, 2004
INVENTOR(S) : Takayuki Sode and Kenji Yoshizawa It is certified that error appears in the above-identified patent and that said Letters Patent is hereby corrected as shown below:

<u>Title page,</u>
Item [73], Assignee, should read -- Soode Nagano Co., Ltd., Okaya-shi (JP) and Nidec Corporation, Kyoto (JP) --.

Signed and Sealed this

Twenty-third Day of May, 2006

JON W. DUDAS
*Director of the United States Patent and Trademark Office*